Oct. 23, 1951      A. W. CLARKE      2,572,319
FISHING REEL
Filed July 16, 1948
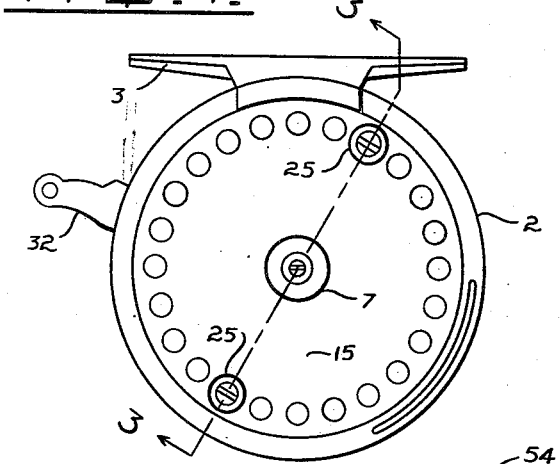
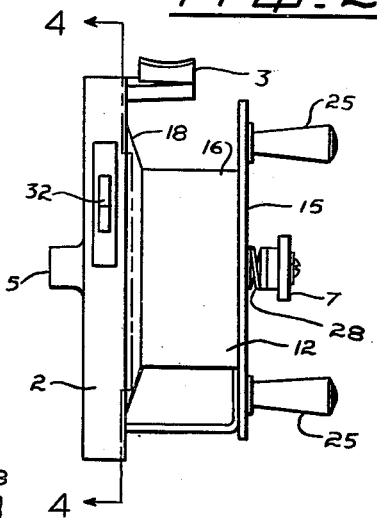
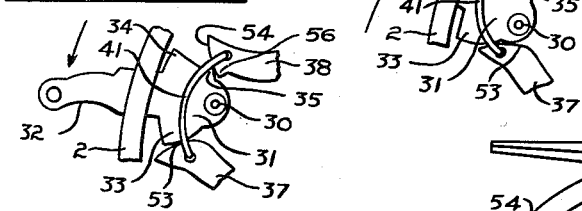
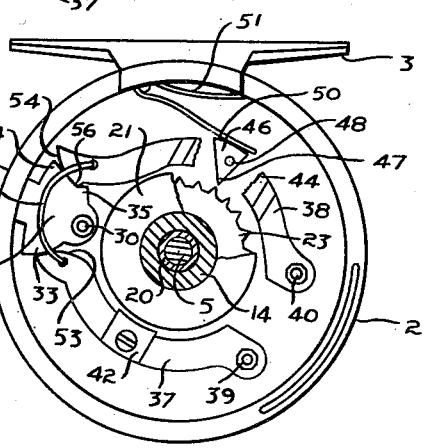
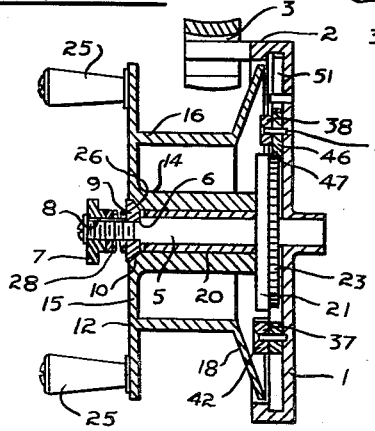
INVENTOR
ARTHUR WILLIAM CLARKE, DECEASED
BY EDNA MARY LAVINA CLARKE, EXECUTRIX
BY Ernest E. Carver
ATTORNEY Patented Oct. 23, 1951

2,572,319

UNITED STATES PATENT OFFICE 2,572,319

FISHING REEL

Arthur William Clarke, deceased, late of New Westminster, British Columbia, Canada, by Edna Mary Lavina Clarke, executrix, New Westminster, British Columbia, Canada Application July 16, 1948, Serial No. 39,027

1 Claim. (Cl. 242—84.6)

The invention relates to improvements in fishing reels.

The objects of the invention are to provide a reel which can be set to give complete control of the fishing line at all times; to provide an adjustable brake tension which can be adjusted at will to conform to the pull of different fish upon said line, and to provide a single control lever to allow the drum of the device to run freely, to allow the line to pay out easily by ratchet resistance and to be drawn in against greater ratchet resistance, and to be paid out under any desired degree of restraint under the control of a hand operated finger lever.

Referring to the drawings:

Fig. 1 is a side elevational view of the invention.

Fig. 2 is a end view.

Fig. 3 is a sectional view taken on the line 3—3 of Figure 1.

Fig. 4 is a sectional view taken on the line 4—4 of Figure 2, showing the cam set to allow free rotation of the drum.

Fig. 5 is a detail view of the cam set to allow the line to pay out or be drawn in against the restraint of the ratchet.

Fig. 6 is a detail view of the cam when applying the brake.

In the drawings like characters of reference indicate corresponding parts in each figure.

The numeral 1 indicates generally a circular base plate having a peripheral rim 2 from which a conventional T-shaped bracket 3 extends to serve as a means for attaching the reel to a fishing rod, not shown. The base plate concentrically supports a fixed spindle 5 which is shouldered and threaded at its free end as at 6 to receive a knurled retaining nut 7 and is provided with a flat face 8 in order to non-rotatably but slidably support a D washer 9 having a conical end 10.

A winding drum 12 is formed with a hub sleeve 14 having a flat outer flange 15 from which a cylindrical sleeve 16 extends, and from the inner end of this sleeve a conical drum flange 18 is integrally supported. A sleeve liner 20 is secured within the hub sleeve 14 and rotatably fits the spindle 5, this liner in effect forms part of the drum 12 and is provided with an integral flange 21 to which a ratchet wheel 23 is secured. A pair of handle cranks 25 are secured to the flat flange 15 of the drum 12 to turn it about its spindle 5. The outer end of the bore of the hub sleeve 14 is tapered to form a seat 26 for the conical end 10 of the D-washer 9 and a compression spring 28 is provided between the nut 7 and the D-washer 9 to maintain an adjustable resistance to rotational movement of the winding drum 12 about the spindle 5.

Mounted in the base of the base 1 and upon a pin 30 is a rocker 31 having a control lever 32. On one side of the rocker 31 is a brake release cam 33 and on the opposite side is a ratchet release cam 34 and a ratchet engaging latch 35. The several cams are engaged selectively by arcuate arms 37 and 38 which are pivotally mounted from the base 1 by pins respectively indicated by the numerals 39 and 40. The arms are interconnected by a C-spring 41 which tends to draw them together and into contact with the several cams 33, 34 and the latch 35. The arm 37 is provided with a brake shoe 42 which is adapted to bear upon the periphery of the flange 21 and to progressively increase its pressure thereon as the control lever 32 is moved upwardly as shown in Figure 6. The arm 38 is offset intermediate its length and supports in the offset portion 44 a triangular rocker 46 having a ratchet tooth 47 at its apex. The ratchet tooth 47 is pivotally mounted upon a pin 48, which pin is to one side of a line extending from the centre of the base and the apex of the triangular rocker. The base of the rocker is slightly rounded as at 50 and a leaf spring 51 is provided to bear upon said base to resiliently align the tooth 47 to one side of the spindle 5 in order that the fishing line will pay out against ratchet resistance more easily than when said line is being wound inwardly. The free ends of the arms 37 and 38 are bevelled outwardly as at 53 and 54 respectively to slidably engage their respective cams 33 and 34 and the latch 35 and a pointed projection 56 is provided at the inner end of the bevel 54 which is adapted to drop over the latch 35 to hold the ratchet tooth 47 out of engagement with the ratchet wheel 23 when it is desired to permit the winding drum 12 to rotate freely.

In use, to allow the line to pay out under light ratchet resistance, the control lever is set in the position as shown in Figure 5 with the pointed projection 56 below the latch 35, if the tension should be increased, appropriate tightening of the knurled nut will add frictional resistance to the drum through the D-washer 9. When it becomes necessary to release the ratchet, the control lever 32 is raised to the position shown in Figure 4, where it becomes latched against return movement.

To apply the brake, the control lever is raised still further as shown in Figure 6, when the outward movement of the arm 38 will draw the arm 37 upwardly through the C-spring 41 and apply the brake shoe 42, when tension may be increased by increased upward pressure on said control lever.

What is claimed is:

A fishing reel comprising a base, a spindle, and a winding drum upon the spindle, a brake disc and a ratchet wheel secured to said drum, a pair of arcuate arms pivotally mounted on the base to embrace said disc and ratchet wheel, a spring connecting the free end of the arms to urge said arms towards each other, a manually operated rocker interposed between the free ends of the arms to move said arms selectively away from each other, one of said arms having a brake shoe engageable with the brake disc and the second of said arms having a ratchet tooth adapted to engage the ratchet wheel, said manually operated rocker having cam faces on opposite sides of its pivot and a latch on one side of said pivot, one of said cam faces being adapted to engage the brake shoe carrying arm to retract said brake, the latch being adapted to engage the ratchet tooth carrying arm to remove said ratchet tooth from the ratchet wheel and said second cam being adapted to progressively urge the ratchet tooth carrying arm away from the ratchet wheel and to permit the brake shoe carrying arm to be drawn towards the brake disc.

EDNA MARY LAVINA CLARKE,
Executrix of the Estate of Arthur William Clarke, Deceased.

REFERENCES CITED

The following references are of record in the file of this patent:

UNITED STATES PATENTS

| Number | Name | Date |
|---|---|---|
| 969,234 | Wollensak | Sept. 6, 1910 |
| 969,235 | Wollensak | Sept. 6, 1910 |

FOREIGN PATENTS

| Number | Country | Date |
|---|---|---|
| 288,101 | Great Britain | Apr. 5, 1928 |